Figure 1:
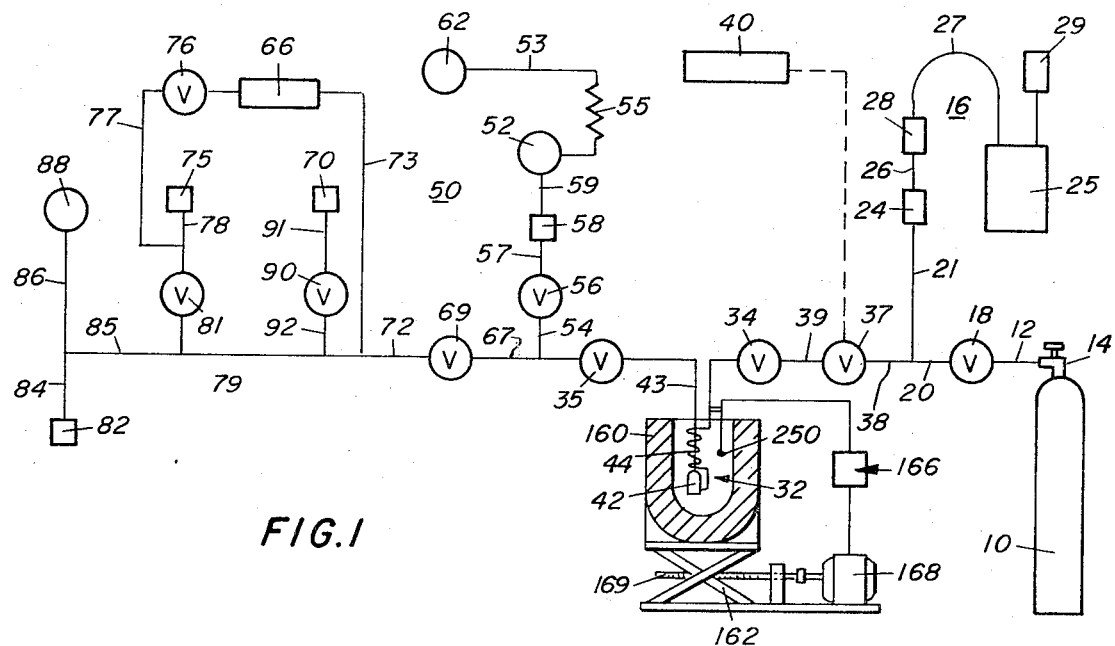

United States Patent
Emerson et al.

[15] 3,662,588
[45] May 16, 1972

[54] DETERMINING IMPURITIES IN HELIUM

[72] Inventors: David E. Emerson; George W. Weems; Clarence A. Hoffman, all of Amarillo, Tex.

[73] Assignee: The United States of America as represented by the Secretary of the Interior

[22] Filed: Apr. 28, 1970

[21] Appl. No.: 32,668

[52] U.S. Cl. .................................... 73/23, 23/294, 55/267
[51] Int. Cl. .................................... G01n 7/00, B01d 51/00
[58] Field of Search .................... 73/19, 23, 25, 28, 29, 17, 73/17 A, 15, 304, 304 C, 401; 23/294, 273 SP, 254; 137/392; 62/22; 55/267, 268, 269, 66

[56] References Cited

UNITED STATES PATENTS

| | | | |
|---|---|---|---|
| 3,291,980 | 12/1966 | Coates e al. | 73/23.1 X |
| 3,557,604 | 1/1971 | Baecklund | 73/19 |
| 3,194,054 | 7/1965 | Deaton et al. | 73/25 |
| 3,427,863 | 2/1969 | Schultz | 73/19 X |
| 3,495,438 | 2/1970 | Mangum | 73/19 |
| 2,601,272 | 6/1952 | Frost | 73/23 |
| 3,296,867 | 1/1967 | Schwien | 73/401 |

*Primary Examiner*—Richard C. Queisser
*Assistant Examiner*—Ellis J. Koch
*Attorney*—Ernest S. Cohen and Gersten Sadowsky

[57] ABSTRACT

Method and apparatus for determining the component impurities of helium. A sample of helium flowing in an analyzer system, including conduits having as a fixed part thereof a trap and coil assembly, is maintained at above atmospheric pressure and a rate of flow which allows its passage freely through the assembly being maintained at the temperature of liquid helium. Impurities are solidified and thereafter isolated by evacuation of the gaseous content of the assembly. The subsequent warming of the assembly provides a gaseous sample of the impurities for analysis in a mass spectrometer of the system. The direction of gaseous flow and the reading of data from instruments of the system are facilitated by valves distributed among the conduits, including a time controlled sampler valve. Liquid helium is maintained at a proper level with respect to the trap and coil assembly by an automatically controlled lift to which is fixed a Dewar vessel containing the liquid helium.

2 Claims, 3 Drawing Figures

INVENTORS
DAVID E. EMERSON
CLARENCE A. HOFFMAN
GEORGE W. WEEMS

BY Ernest S. Cohen
Gersten Sadowsky
ATTORNEYS

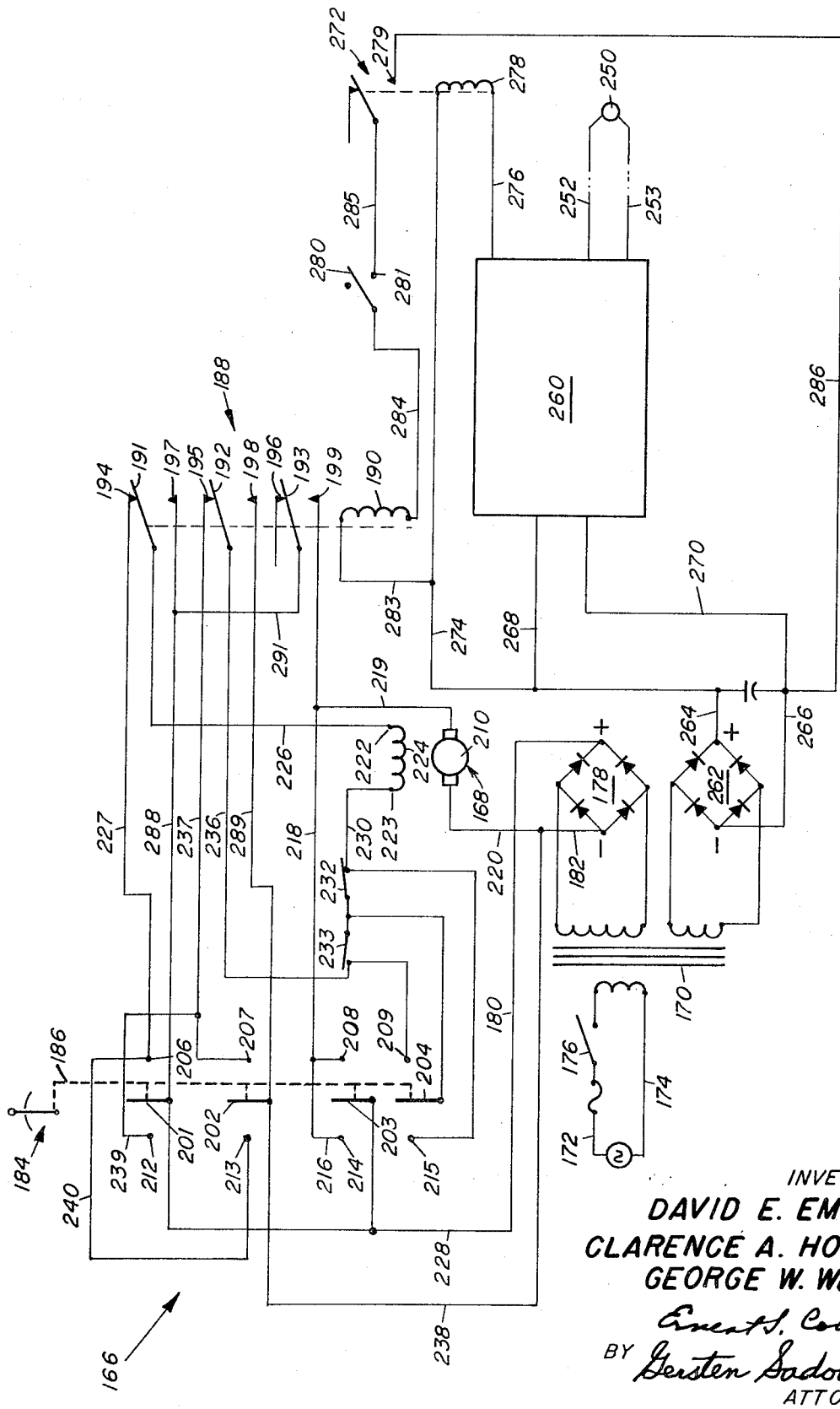

DETERMINING IMPURITIES IN HELIUM

The invention relates to a method and apparatus for investigating impurities of helium, and wherein samples of highly purified helium are tested by concentrating trace impurities contained in the helium to a degree that will permit analysis of these impurities by a mass spectrometer.

There is growing demand for ultrapure helium in industry, space, and research applications, requiring new analytical techniques for accurate identification and quantitative determination of impurities in helium in the part per billion range. Analysis of helium impurities has heretofore been conducted by concentrating the impurities on activated characoal held at 196°C, and subsequently separating these impurities on a 5A molecular sieve for detection by a thermal conductivity type of detector. Gas chromatography has also been applied for the analysis of such impurities with or without prior concentration thereof. However, since a chromatographic procedure must be calibrated, some unknown or unexpected impurity could escape detection by being retained in the column or being eluted simultaneously with another component.

A helium testing method employing a preconcentration of impurities, implemented by freezing them at below atmospheric pressure, which is described in U.S. Pat. No. 3,194,054, granted July 13, 1965, to W. M. Deaton and C. G. Kirkland, provides a highly accurate determination of trace impurities, having a sensitivity of approximately 1 part per million for each contaminant. Preparatory determinations required in connection with this patented procedure increases the expense and time involved in testing. Each use of the procedure requires that the volume of metal coil and trap assemblies, and a trap-to-spectrometer pressure correction factor be determined along with time consuming calculations based on total sample pressure. On the other hand, the method and apparatus of the present invention permits a lower minimum detectable limit of 0.01 part per million; and in repeated use does not require determinations of total pressure, pressure correction factor, and specific volume of the coil and trap assemblies. Thus, calculations are less complex, and are less time consuming. Moreover, the invention disclosed herein utilizes only one metal coil and trap assembly connected permanently to the apparatus whereby possible air contamination, such as would be due to the connecting and disconnecting of metal coil and trap assemblies required for testing according to the aforesaid patented procedure, is eliminated. Resultant savings of set-up time made possible thereby permit significantly more analyses to be made during scheduled use of the instant invention.

In the present invention a sample of helium gas to be tested is passed through a trap and coil assembly held at the temperature of liquid helium, and this gaseous flow is maintained at a sufficient rate to avoid the liquification of the helium in the sample. After evacuation of passages arranged between the coil and trap assembly and a mass spectrometer, the solidified impurities are brought to room temperature such that their gases expand into such passages and are disposed thereby to be routed into the mass spectrometer for analysis. The peak heights established for the component impurities permit a determination of their partial pressures and part per million in the sample. The invention further provides apparatus automatically determining the sample volume of gaseous flow, and maintaining the trap and coil assembly in a sufficient depth of liquid helium during the passage of the sample therein.

Figure 2:
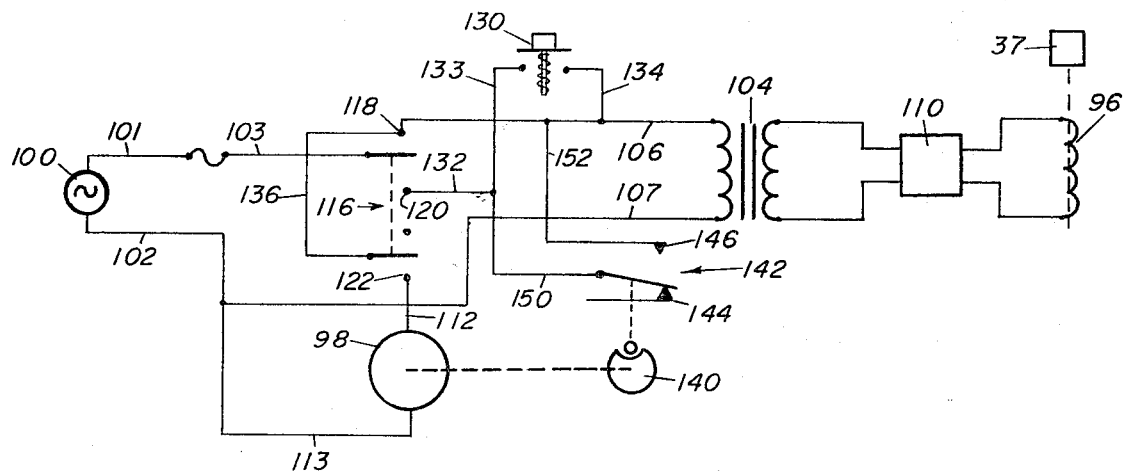

Objects and advantages of the invention will be more clearly understood from the following description of a preferred procedure and embodiment of the invention, considered together with the accompanying drawing wherein:

FIG. 1, is a schematic diagram showing an overall arrangement of equipment for a preferred embodiment of the invention, FIG. 2, is a schematic circuit diagram of a valve controller mechanism having utility in the arrangement of FIG. 1, and FIG. 3, is a further schematic circuit diagram illustrating details of a controller for positioning a vessel so as adjust the liquid helium level therein with respect to a trap structure in which impurities are separated from helium.

The invention employs a mass spectrometer to determine the parts per million of contaminant components in a sample of helium. Basic considerations in an analysis of gaseous mixtures by mass spectrometers, such as pertains to the invention disclosed herein, are discussed in detail in chapter IV of the text Mass Spectrometry by A. J. B. Robertson, published by John Wiley & Sons, Inc. New York, in 1954. Mass spectrometer sensitivities are determined by analyzing pure gases. An examplary mass spectrometer analysis giving the sensitivities thereof to gases of interest appears in Table I which follows.

TABLE I

Mass spectrometer sensitivities (20.0 microamperes ionizing current)

| Component | Sensitivity divisions/micron |
|---|---|
| Hydrogen | 400.34 |
| Methane | 216.02 |
| Neon | 73.04 |
| Nitrogen | 199.93 |
| Carbon Monoxide | 209.12 |
| Ethane | 56.21 |
| Oxygen | 150.60 |
| Argon | 210.63 |
| Carbon Dioxide | 159.00 |

Since these sensitivities normally vary slightly from one period of spectrometer use to another, corrections for such slight variations are made fron an analysis of a neon calibration gas each such operating period and used as a base to ratio the other sensitivies for that period.

It is known that partial pressure of each contaminant is determinable by dividing the mass spectrometer peak height reading for the component by by its sensitivity value as shown in equation (1).

partial pressure ($\mu$) = peak height (divisions)/sensitivity divisions/micron    (1)

Also recognized is that when analyzing a sample by mass spectrometry, the partial pressure of a component in a gas mixture is independent of the total pressure as long as the inlet system of the instrument is at low pressure and the flow of gas molucules through the gold leak thereof at a constant rate is molecular. Therefore, the contaminants in the sample are calculatable from the relationship.

$P_2 V_2 / P_1 V_1 \times 10^6$ = parts per million of component in sample.

where $P_1$ = barometric pressure, mm Hg
$V_1$ = volume of gas passed through apparatus, in liters
$P_2$ = partial pressure in mm Hg volume of the mass spectrometer inlet system and attached apparatus, in liters. $V_2$
  = calibrated internal volume of the mass spectrometer inlet system and attached apparatus, in liters.

The calibrated internal volume $V_2$ can be determined by comparison with a previously calibrated known volume in a manner disclosed by C. A. Seitz and D. E. Emerson in an article *A Simple Method for Determining the Volume of Closed Containers*, published in Analytical Chemistry, Volume 40, No. 1, January 1968, pages 260 to 262. Since $V_2 / P_1 V_1 \times 10^6 = K$, a constant    (3)

when $V_1$ and $P_1$ are constant, equations (1) and (3) are combined to give the relationship $\left( \dfrac{\text{peak height}}{\text{sensitivity}} \right) K$ = ppm of component in sample.

A system structured according to the schematic representation of FIG. 1, is particularly suited for facilitating mass spectrometer readings of peak heights, corresponding to contaminant components, which would be applicable to the solution of the aforesaid relationship. Helium samples are provided from a storage cylinder 10 to an outlet conduit 12 by way of a manually operable cylinder valve 14. Cylinder 10 is associated with a pressure purge and safety pressure relief system 16 by way of a flow control valve 18, and connections through conduits 20, and 21. Purge and relief system 16 comprises a 15 microns filter 24, a purge volume container 25 connected through conduits 26 and 27, with a low pressure (⅓ psig) relief valve 28 leading to an inlet of container 25 having at its outlet a high pressure (50 psig) valve 29. Cylinder 10 further cooperates with a trap and coil fixture 32 and valves 34 and 35 associated therewith, by way of a remotely controlled sampling valve 37 and connections through conduits 38 and 39. Valve 37 is solenoid operated in response to switching operations in a controller mechanism 40, to be hereinafter more fully described.

Trap and coil fixture 32 comprises a reservoir enclosure or trap 42 which is entered at its top by a straight leg conduit 43, and at its side by the end of a coil of tubing 44, and is otherwise constructed in a manner more fully shown and described in previously identified patent to Deaton et al. An arrangement of instrumentation 50, appearing in FIG. 1, provides the system illustrated therein with means for measuring the volume and pressure characterizing the sample flow through trap and coil fixture 32. This arrangement includes a gas flow indicator 52 to which gas from fixture 32 flows by way of trap leg 43, valve 35, a conduit 54, a shut-off valve 56, a conduit 57, a low pressure (⅓ psig) relief valve 58, and a conduit 59. A wet test meter 62 is linked to flow indicator 52 by way of a tubing 53 having operable therein an adjustable restrictor 55 used in the calibration of the meter. Gas fed to meter 62 passes through in discrete quantities which are measured therein to provide readings of flow volume. Pressure-readings of gas flow from fixture 32 are taken on a micromanometer 66 in a gas flow circuit including a conduit 67 extending back to the fixture by way of valve 35, a valve 69 adapted to isolate a mass spectrometer 70, as will be hereinafter more fully explained, and further conduits 72 and 73. Micromanometer 66 comprises an AC bridge circuit having in one arm a capacitor unit sensitive to the pressure of gas fed thereto, and in another arm a null control unit settable to balance the bridge and provide an indication of the gas pressure. A vacuum pump 75, connected to micromanometer 66 by way of a vacuum valve 76, and conduits 77 and 78, is also connected to fixture 32 by way of valves 35 and 69, as well as conduits 67, 72, a conduit 79, and a further vacuum valve 81. A vacuum gage 82 is connected to pump 75 by way of conduits 84, 85, and valve 81. The passage defined by conduits 72, 79, 85, 84, and a further conduit 86, terminates in an expansion volume enclosure 88. Mass spectrometer analyzer 70 is operatively associated with fixture 32, and the instrumentation of arrangement 50, by way of an analyzer valve 90 and a conduit 91 to the analyzer, and conduit 92 to system conduits 72 and 79.

Referring now to the FIG. 2 showing of the electrical parts constituting sample valve controller 40, sample valve 37 appears as actuatable by a solenoid represented by coil 96. Power for energizing coil 96, as well as a timer motor 98, is received from a 60 cycle source 100 on leads 101 and 102. A step-down transformer 104 is shown energized by voltage applied to its primary winding through leads 106 and 107 which are arranged to be connected with power leads 101 and 102, respectively. The transformer is thereby adapted to supply voltage to a full wave bridge rectifier 110 having valve actuator coil 96 connected across the output terminals thereof.

Timer motor 98 is supplied with current on leads 112 and 113, the latter lead being directly connected to power lead 102.

Manual control of sample valve 37 is facilitated by a double pole, double throw switch 116 in a first positioning thereof which completes at its contact 118 an energizing circuit for transformer 104 comprising leads 101, 103, 106, 107 and 102. In a second positioning of switch 116 circuits which are extended through contacts 120 and 122 thereof, are adapted to effect automatic energization of timer motor 98 together with transformer 104 and valve actuator coil 96 therewith.

Accordingly, with switch 116 in its second position, an automatic operation of controller 40 is initiated by depression of a self-released start cycle button switch 130 which completes across its contacts an energizing circuit for motor 98. This circuit from power lead 101 is traceable through lead 103, contact 120, leads 132 and 133, closed switch 130, leads 134, 106, 136, contact 122, lead 112, timer motor 98, and leads 113 and 102. The timer motor is thus operated to rotate a notched camming disk 140, connected thereto, on which rides an actuator for a single pole, double throw switch 142. When the switch actuator rides out of the notch in disk 140 it shifts the single contact arm of switch 142 from an open circuit contact 144 to a contact 146 in energizing circuitry for valve coil 96, as well as motor 98. The coil circuit is traceable from power lead 101 through lead 103, contact 120, lead 132, a lead 150, contact 146 of switch 142, a lead 152, and lead 106 to transformer 104 and a circuit return through leads 107 and 102. The motor circuit is traceable from power lead 101, through lead 103, contact 120, leads 132, 150, contact 146, leads 152, 106, 136, contact 122, lead 112, motor 98, and a circuit return through leads 113 and 102. Since circuit closure at switch contact 146 shunts the contacts closed by button switch 130, release of this switch finds controller 40 operating to maintain sample valve 37 open until camming disk 140 completes one complete turn whereat the return of the actuator of switch 142 to the disk notch allows the switch contact arm to open the circuits heretofore completed at contact 146. The coil and motor energizing circuits thus made ineffectual are thereafter again completed either manually by reversing the positioning of switch 116, as was previously explained, or automatically by a further momentary depression of button switch 130.

A requisite cooling of trap and coil fixture 32 in accordance with the invention is accomplished by immersing the fixture in liquid helium contained in a Dewar vessel 160, as illustrated in FIG. 1. This immersion, is implemented by the operation of a motor driven jack mechanism 162 to which vessel 160 is affixed so as to present a surface of liquid helium therein to the bottom of the fixture. The level of this surface with respect to fixture 32 is adjustable by manual and automatic control exercised over the jack by a position controller 166. A low-power, high gear ratio drive motor 168, operationally directed by controller 166, is arranged to turn a screw 169 which positions a lifting clamp of a conventional scissors device which sets the level of jack mechanism 162 in an obvious manner. Jack motor 168, which appears in the midst of the electrical parts of controller 166 as schematically represented in FIG. 3, is supplied with energizing power originating in an AC source connected to a step down transformer 170 by a circuit comprising leads 172 and 174, and a power switch 176. A first secondary of transformer 170 provides a voltage across input terminals of a full wave bridge rectifier 178 which in turn supplies an energizing output in the controller on positive lead 180 and negative lead 182. A manually operable control is provided which comprises a multiple contact, double throw switch 184 wherein interconnected switch arms are manipulatable together by a linkage 186 for movement to the right or left, as viewed in FIG. 3, so as to effect the completion of circuits energizing motor 168 to raise or lower Dewar vessel 160, respectively. The aforesaid circuits include further connections through multiple contacts of a relay 188 which comprises an electromagnet actuator 190 made operable in a manner and for a purpose to be hereinafter explained.

Relay 188 responds to power in its coil 190 by shifting its contact arms 191, 192, and 193 from engagement with contacts 194, 195 and 196, respectively, into engagement with contacts 197, 198, and 199, respectively. When manual control 186 is set so as to raise jack 162, contact arms 201, 202, 203 and 204 of switch 184 engage fixed contacts 206, 207, 208, and 209, respectively. A drive for lowering jack 162 finds contact arms 201, 202, and 204 in engagement with contacts 212, 213, 215. Corresponding energizing circuits for the motor armature 210 are completed by switch 184 whether up or down drive is directed. Thus, the positive voltage on lead 180 is applied to motor armature 210 through contact arm 203 in engagement with either fixed contact 208 or 214 since a lead 216 joins the fixed contacts and extends a circuit therefrom to motor armature 210 by connection to leads 218 and 219. The armature circuited is completed by a return lead 220 which extends the circuit to a connection with source negative lead 182.

On the other hand, circuit polarity is changeable at terminals 222 and 223 of the motor field winding 224, in accordance with the directional control set by switch linkage 186. With contact arms 201 to 204 shifted right to accomplish an up drive, an energizing circuit to motor field winding 224 is traceable from terminal 222 to source positive by way of a lead 226, closed relay contacts 191 and 194, a lead 227, closed switch contacts 201 and 206, a lead 228, and positive lead 180; and from terminal 223 to source negative by way of a lead 230, normally closed up and down limit switches 232 and 233, a lead 236, closed relay contacts 192 and 195, a lead 237, closed switch contacts 207 and 202, a lead 238, and negative lead 182. When contact arms 201 to 204 are shifted left to accomplish a down drive, an energizing circuit to motor field winding 224 is traceable from terminal 222 to source negative by way of lead 226, closed relay contacts 191 and 194, lead 227, a lead 240, closed switch contacts 213 and 202, lead 238, and negative lead 182; and from terminal 223 to source positive by way of lead 230, limit switches 232 and 233, lead 236, closed relay contacts 192 and 195, lead 237, a lead 239, closed switch contacts 212 and 201, lead 228, and positive lead 180.

Up drive travel can be directed automatically by the electrical response of a liquid level sensor 250 which is attached to fixture 32, and ordinarily located in an upper section of Dewar vessel 160, as shown in FIG. 1. Sensor 250 may be a low power carbon resistor which changes in resistance as the liquid helium level drops with respect to fixture 32. Referring again to FIG. 3, sensor 250 appears with connections to leads 252 and 253 which extend into the circuits of a conventional high-gain operational amplifier 260. Energizing voltage is supplied to amplifier 260 from a further secondary winding of transformer 170 by way of a further full wave bridge rectifier 262. Positive and negative voltage source leads 264 and 266 from the rectifier are extended to connections in the amplifier by leads 268 and 270, respectively. A low power relay 272 operatively responds to the amplifier voltage across leads 274 and 276 connected to the relay actuating coil 278. With power switch 176 closed, liquid level sensor 250 constitutes a normally closed switch in the amplifier circuit until liquid helium contacts the sensor whereby the critical rise in its resistivity effectively opens the amplifier circuit. However, when the amplifier is operational, relay 272 is energized, and its contact arm is held closed at a fixed contact 279 in a circuit connected across rectifier output leads 264 and 266 which is adapted to energize actuator coil 190 of the directional control relay 188. Closure of a double throw control switch 280 at its contact 281 completes the relay energizing circuit which is traceable from source positive on leads 264, 274, a lead 283, coil 190, lead 284, switch contact 281, lead 285, relay contact 279, and lead 286 to source negative lead 266. Relay 190 then functions to shift its respective contact arms 191 to 193 into separate engagement with contacts 197 to 199, and thereby complete circuits energizing motor armature 210 and field winding 224 such that motor 168 engenders an upward drive.

The armature circuit is traceable from source positive on leads 180, 228, 288, 291, closed relay contacts 193 and 199, and leads 218 and 219, and from source negative on leads 182 and 220. The motor control circuitry is traceable from field winding terminal 222, by way of lead 226, relay contacts 191 and 197, a lead 288, and lead 180 to source positive; and from field winding terminal 223, by way of lead 230, limit switches 232 and 233, lead 236, relay contacts 192 and 198, a lead 289, lead 238, and lead 182 to source negative.

A helium analyzing procedure in accordance with the present invention is effectuated by following the steps thereof which are hereinafter set forth with reference to the embodiment of the analyzing system previously described.

1. Attachment of cylinder 10 by securing its valve 14 to conduit 12, makes available a helium sample for analysis. Valve 37 is initially closed along with valves 14 and 18 to prevent gas flow in the system. Valves 34, 56 and 69 are likewise closed to isolate coil and trap fixture 32, flow indicators 52 and 62, and mass spectrometer 70, respectively, from the sample intake structure. However, the system's further valves 76, 81, 90, and 35, are then in open condition.

2. After valve 18 is opened relatively wide, purge system 16 is made effective by momentarily opening cylinder 14, three or four times, allowing the pressure to subside after each time valve 14 is opened. Gas purged from source 10 passes, by way of valve 14, into conduit 12 and through valve 18, conduits 20, 21, filter 24, conduit 26 low pressure relief valve 28, conduit 27, purge volume container 25, and out of the system through high pressure relief valve 29. Valve 14 is thereafter opened fully as valve 18 is being closed. Micron filter 24 functions to preclude foreign matter from getting on the seats of relief valves 28 and 29.

3. Controller 40 is manually operated to open valve 37, and together therewith valve 56 is opened to place flow meter indicator gage 52 and wet test gas volume meter 62 in action so as to respond to gas flow.

4. The trap and coil assembly constituting fixture 32 is admitted into the system by gradually opening valve 34 so as to protect gage 52, until the valve is opened fully. Valve 18 is again opened to initiate flow of the helium sample, by way of conduits 20 and 38, open valve 37, conduit 39, opened valve 34, coil and trap fixture 32, conduit 43, open valve 35, conduit 54, opened valve 56, and conduit 59, until gage 52 indicates a pressure of approximately 20 inches of water. Thereupon, trap 42 and coil 44 are heated gently to flush out residual impurities, after which the assembly is cooled to room temperature. Valve 18 is subsequently readjusted to moderate sample flow until gage 52 indicates only twelve inches of water In a preferred embodiment of the system an indication of 20 inches of water indicates a flow of 1, 115 $cm^3$/min which is higher than normal in order to facilitate flushing impurities out of the coil and trap assembly. Normal sample flow is 820 $cm^3$/min.

5. The trap and coil assembly is thereafter cut-off from the system by closing valve 34, and then valve 35. The volume indicated by the reading on wet test meter 62, and the ambient barometric pressure are recorded for reference. Trap 42 is precooled by the application of liquid nitrogen thereto in a manually positioned separate Dewar flask. Liquid helium in Dewar vessel 160 is thereafter brought into contact with the bottom of the trap and coil assembly by closing jack controller switch 280 on to contact 281, or positioning switch 184 of this controller to raise the vessel to the requisite height. Using manual control at switch 184, the vessel is further raised until the level of the liquid helium is at the third coil of fixture 32.

6. Sample flow through the trap and coil assembly is started by opening valves 34 and 35 simultaneously, and a timing of the flow is started by adjusting valve controller switch 116 to close at contact 120 for automatic operation. The flow path of the helium delivered from source 10 is traceable through conduits 12, 20, 38, 39, 43, 54, 57, 59, and 53, wherein valves 14, 18, 37, 34, 35, and 56 are open, by way of coil 44 and trap 42, relief valve 58, and exits from the system through gage 52, and the gas outlet of meter 62. Freeze out of the impurities is caused to occur at above atmospheric pressure by balancing the heat input to keep helium from liquifying in the trap and coil assembly. Consequently, the flow rate cannot be allowed to drop during the flow-through step. Jack controller 166 is also set for automatic operation at that time by again effecting closure of switch 280 at contact 281, whereby the liquid level of helium will be maintained at the third coil of the trap and coil assembly. After three liters of sample have passed through the trap and coil assembly controller 40, shown in FIG. 2, automatically functions in response to an operation by its motor drive wherein prearranged timer cam 140 is rotated until it permits the contact changeover of controller switch 142 which effects the closure of valve 37. In the disclosed embodiment the motor operated cam is set to run for 3 minutes and 40 seconds.

7. The flowmeter is again cut-off by closing valve 56, as sample control valve 37 is once more closed. Dewar vessel 160 is lifted by a manual adjustment of switch 184 to the right, as seen in FIG. 3, until the liquid helium level is raised one-half inch further so as to preclude the possible loss of the sample when pumping off excess gaseous helium in a subsequent step. Valve 90 is operated to close it, whereas valve 81, leading to vacuum pump 75, is left opened. Thereafter interconnecting valve 69 is gradually opened until the pressure, as indicated on vacuum gage 82, reaches a maximum value. The possibility of losing the sample due to an abrupt pressure change is thus lessened. With valve 69 completely open, a ready control is maintained upon valve 35 so as to permit closure thereof when the pressure on gage 82 is indicated to be 50 microns. The wet test meter reading is recorded at that time so as to establish a reading of volume of helium passed prior to the start of sample gas flow to which the reading taken at the termination of gas flow through the apparatus is compared in order to determine the volume of gas passed through the system, corresponding to $V_1$ of equation (3), supra. Since the gaseous content of the system has then been removed by vacuum pump 75, only the solidified part of the sample remains in the trap and coil assembly.

8. Liquid helium level position control 166 is again operated by manual control switch 184 to lower the liquid helium level away from the trap and coil assembly. Valve 90, controlling the passage to mass spectrometer analyzer 70, is opened momentarily for further evacuation, in particular, the area between the analyzer gold leak and the valve. Unheated air is applied to the trap and coil assembly so as to warm the assembly to room temperature. At this point in the procedure the gaseous contaminants are to be expanded into the high vacuum (1 micron) associated with an expansion thereof into volume enclosure 88 and allied conduit. Thus, valve 90 is closed to avoid a continuous leak through the gold leak into the high vacuum of the analyzer section of mass spectrometer 70, and permit the sample to equilibrate. Accordingly, after isolating the analyzer 70 and pump 75 by closing valves 90 and 81, the trap and coil outlet valve 35 is opened whereby the contents of the trap and coil fill the passages defined by the system conduits shut-off by the closed valves 34, 56, 81, 90, and micromanometer 66.

9. After the pressure has equilibrated, valve 69 may be optionally closed to isolate analyzer 70 from the trap and coil assembly since it has no effect on the analyses, and valve 90 is subsequently opened to admit a sample from the contents of the conduit passages at the left of valve 69 as seen in FIG. 1, to mass spectrometer 70 for an analysis thereof. Each individual peak height established on spectrometer 70 determines the partial pressure of each component in the sample. The summation of these individual pressures should equal the total sample pressure as obtained with micromanometer 66. Valve 76 can be closed to prevent contamination of the micromanometer pressure sensitive capacitor gage due to accidental loss of vacuum or other means of contamination.

While a particular preferred procedure and an embodiment of the present invention have been illustrated and described herein, it will be understood that this invention is not limited thereto, but is susceptible to change in form and detail.

What is claimed is:

1. An analyzing apparatus for determining the component impurities of a helium sample comprising
   means supplying said helium sample,
   a gas trapping enclosure vessel,
   a mass spectrometer analyzer,
   a vacuum pump,
   conduit means adapted to define a passage for the flow of said helium sample from said supply means thereof to said enclosure vessel, having valve means connected therein to regulate the rate and volume of said flow,
   an insulated vessel supported at the base thereof by vertically adjustable means, and storing liquid helium so as to present, when at first positions of adjustments, the liquid level of helium therein to the base of said enclosure vessel, and at second positions of adjustment, the liquid helium therein to outer surfaces of said enclosure vessel, said vertically adjustable means comprising a platform having the base of said insulating vessel affixed thereto, a mechanically adjustable means supporting said platform and operable to raise and lower said platform, a bidirectional motor adapted to drive said mechanically adjustable means, and a switching circuit enabling operation of said motor in predetermined directions, said circuit having switch control means responsive to means for sensing the level of said liquid helium in said insulated vessel which automatically conditions said switch control means into one state thereof whereby said circuit enables operation of said motor in one of said predetermined directions, and manually settable switch means made effective through circuit connections made by said switch control means disposed into a second state thereof to condition said circuit to enable operation of said motor in either one of said predetermined directions, and
   further conduit means adapted to define passages completed through further valve means connected for operation therein in a predetermined sequence whereby gaseous flow is selectively routed between said enclosure vessel, said analyzer, said vacuum pump, and an arrangement of instrumentation including a gas flow indicator controlling a volume measuring meter, vacuum pressure gage, and a micromanometer measuring the pressure of a gaseous sample produced in said enclosure vessel for admission to said mass spectrometer analyzer.

2. A method for determining the component impurities of a sample of helium gas in parts per million comprising in sequence the steps of
   further cooling a precooled gas trapping assembly, comprising an enclosure vessel and a predetermined length of a winding gas flow passage entering said enclosure vessel, by initially displacing a confined liquid helium bath so as to apply the liquid level surface thereof to a base surface of said enclosure vessel, and subsequently further displacing said liquid helium bath so as to submerge said enclosure vessel and a predetermined portion of said winding gas flow passage within said liquid helium below said liquid level surface thereof,
   causing a measured volume of said sample of helium gas to flow by way of said winding gas flow passage through said enclosure vessel cooled to the temperature of liquid helium, and wherein the pressure is maintained at an above atmospheric pressure and said flow of helium gas is maintained at a rate which precludes the liquification of helium whereby impurities of said helium gas are solidified in said enclosure vessel, still further displacing said liquid helium bath so as to further submerge said enclosure vessel and said winding gas flow passage and situate a predetermined additional portion of said winding gas flow passage within said liquid helium below said liquid level surface thereof, and thereafter evacuating the gaseous residue in said gas trapping assembly, isolating said gas trapping assembly by shutting off inlet and outlet conduits thereto, and thereafter yet still further displacing said liquid helium bath so as to completely separate said liquid helium at said liquid level surface thereof from said gas trapping assembly, warming said gas trapping assembly to an ambient temperature, opening said outlet conduit whereby gaseous contents of said warmed gas trapping assembly is permitted to flow to a mass spectrometer analyzer, determining the partial pressure of each component impurity as determined in said analyzer by the sensitivity of said analyzer with respect to said component impurity, and finding said parts per million of each of said component impurities by multiplying said component impurity partial pressure in millimeters of mercury by a constant defined by $V_2/P_1V_1 \times 10^6$, where $V$ is the volume in liters of said gas flow through said gas trapping assembly, $V_2$ is the internal volume of said gas trapping assembly and conduits in which said gaseous impurities are lead from said gas trapping assembly to said analyzer, and $P_1$ is the ambient barometric pressure in millimeters of mercury.

* * * * *